June 27, 1961     A. CLEMENS, JR     2,990,301

ARC WELDING ELECTRODE

Filed Oct. 23, 1957

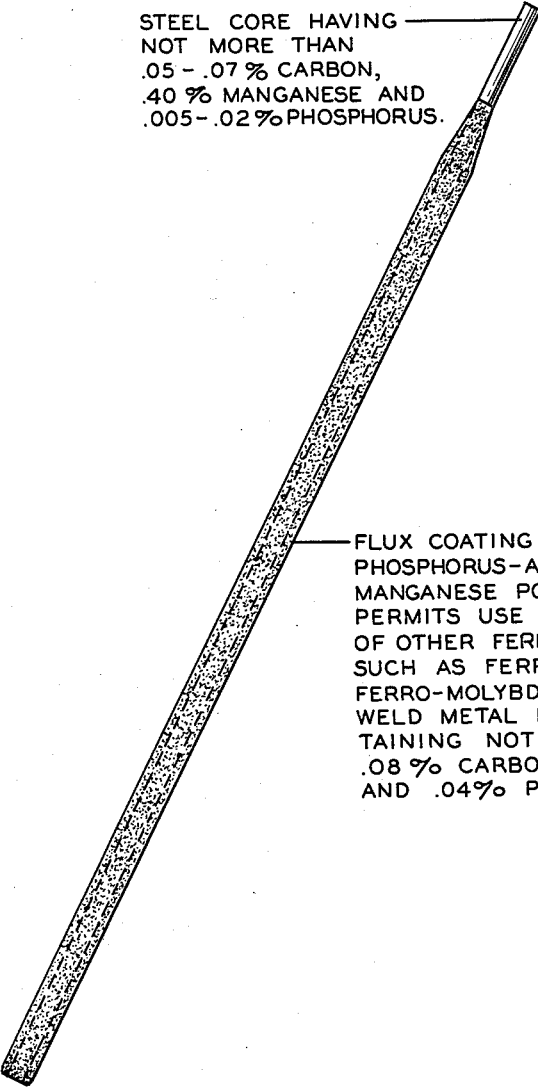

STEEL CORE HAVING NOT MORE THAN .05 - .07 % CARBON, .40 % MANGANESE AND .005 - .02 % PHOSPHORUS.

FLUX COATING CONTAINING PHOSPHORUS- AND CARBON-FREE MANGANESE POWDER WHICH PERMITS USE IN THE COATING OF OTHER FERRO-FORM ALLOYS SUCH AS FERRO-CHROMIUM AND FERRO-MOLYBDENUM TO OBTAIN WELD METAL DEPOSITS CONTAINING NOT MORE THAN .08 % CARBON, 2.50 % MANGANESE AND .04 % PHOSPHORUS.

*INVENTOR.*
AUGUST CLEMENS, JR.

BY *Edmund W Bopp*

AGENT

2,990,301
ARC WELDING ELECTRODE

August Clemens, Jr., Baltimore, Md., assignor, by mesne assignments, to Air Reduction Company, Incorporated, New York, N.Y., a corporation of New York
Filed Oct. 23, 1957, Ser. No. 691,810
9 Claims. (Cl. 117—207)

The invention relates to improvements in arc welding electrodes of the type comprising a steel core provided with a coating composition containing chromium, or chromium and nickel, to supply such metal or metals to the weld deposit in the welding of chromium, or chromium-nickel alloy steels.

It has been recognized that electrodes made of a readily-formable steel core which is coated with a composition containing chromium or chromium and nickel for the weld deposit (for brevity, such electrode will hereinafter be arbitrarily termed "a chromium coated electrode") should afford numerous advantages over stainless steel wire electrodes. Stainless steel wire electrodes produce excellent welds from the standpoint of strength, toughness, ductility, etc.; however, they are difficult and costly to manufacture. Moreover, stainless steel wire electrodes present problems in use. Due to their high electrical resistance, care must be exercised to keep the welding current low to prevent them from becoming unduly hot. As a result, more time is consumed in welding.

The prior art attempts to replace the stainless steel wire electrode with a chromium coated electrode have not been entirely successful. Apparently the difficulty has been to obtain a proper balance between the compositions of the core and the coating, particularly insofar as obtaining the proper amounts of carbon and manganese in the weld deposit. Also, it has been difficult not to exceed the critically low phosphorus content required in the weld deposit.

A sound weld of sufficiently high impact strength requires the formation of ferrite, and the inclusion of a critical amount of manganese. On the other hand, to properly weld stainless steel plates, such as 18% chromium and 8% nickel alloy steels, requires that the weld deposit shall not contain in excess of .08% carbon. The source of manganese in the coating of prior art chromium coated electrodes is ferro-manganese, which serves to increase the carbon content in the weld deposit. To make matters worse, and even further increase the carbon content of the weld, additional iron compounds have been used with the ferro-manganese in the coating, such compounds being ferro-silicon, ferro-titanium, ferro-chromium, and ferro-molybdenum. The latter is the only commercially practical source of molybdenum at present, and is an essential ingredient of the coating when welding stainless steel plates containing molybdenum. Although ferro-chromium may be replaced entirely with metallic chromium powder, it is desirable to use this compound because of its cost advantage. In any event, these iron compounds entrain carbon into the weld deposit and adversely affect the chemical and physical properties of the deposit. Moreover, these iron compounds bring over phosphorus into the weld in amounts which cannot be tolerated. Phosphorus above a certain low critical amount causes cracks to develop in the weld.

The primary object of the invention is to provide an electrode of the chromium coated type for welding chromium alloy or chromium-nickel alloy steels, with or without molybdenum, wherein the composition of the core and the composition of the coating upon the core are in such balanced relationship that the weld metal provided by such electrode possesses physical and chemical properties which are the equal of the properties obtained with a stainless steel wire electrode.

Another object of the invention resides in providing a steel which may easily be drawn into the wire for the core in combination with a coating composition which, together, will afford the manganese necessary in the weld deposit, and yet will not unduly increase the carbon content in the weld deposit. Pursuant to the realization of this objective, the coating composition may contain ferro-molybdenum to supply molybdenum to the weld deposit, when required, without unduly increasing the carbon content in the deposit. Also, the related compositions of the steel core and the coating enable attaining a weld deposit which has a minimum of phosphorus and is crack-free.

The accompanying drawing is a self-explanatory illustration of the invention.

In accordance with the invention, satisfactory weld deposits, or deposits which meet the requirements which have been established in connection with stainless steel wire electrodes, are obtained with a chromium coated electrode to weld stainless steel plates, such as chromium alloy steels, or 18% chromium-8% nickel alloy steels, with or without molybdenum, by so correlating the composition of the core and the coating for the core that the carbon and the manganese in the weld are kept to the desired minimum amounts. The form in which the manganese is used in the coating allows some leeway when, for example, carbon- and phosphorus-entraining ferro-molybdenum is necessary to furnish molybdenum for the weld deposit. Metallic manganese powder, free of carbon, is used in the coating. Also, if ferro-chromium is used in some measure in the coating to supply chromium for the weld, the form in which the manganese is used allows use of this carbon- and phosphorus-containing iron compound without causing an excess of carbon and phosphorus in the weld, particularly, since the core is made of a steel which contains significantly small amounts of carbon and phosphorus.

In greater detail, the core wire is made of a special mild steel having a carbon content not in excess of .07%; preferably a carbon content as low as .05% is used. Manganese does not exceed .40%, and the phosphorus content is not in excess of .02%, and preferably as low as .005%. The composition analysis of a typical core wire used in accordance with the invention is as follows:

| | Percent |
|---|---|
| Carbon, maximum | .07 |
| Manganese, maximum | .40 |
| Phosphorus, maximum | .02 |
| Sulfur, maximum | .03 |
| Silicon, maximum | .03 |
| Iron | Balance |

For welding chromium-nickel alloy steel plates, such as 18% chromium-8% nickel, the coating composition which is applied to the core wire is as follows:

| | Percent |
|---|---|
| Nickel powder | 11.0–13.5 |
| Manganese powder | 2.5–9.0 |
| Chromium | 25.5–39.5 |
| Fluxing, slag-forming, binder, extrusion and stabilizing agents | Balance |

The ratio of metal powders to the fluxing, slag-forming, binder and other ingredients is approximately one to one.

The manganese is in the form of a metallic powder, which is substantially entirely free of carbon. To assure the absence of carbon, the metal is preferably obtained by an electrolytic process. The manganese powder is also devoid of phosphorus.

With regard to the chromium source in the coating for the weld deposit, the elimination of carbon in the manganese-providing medium, or the metallic manganese powder, permits the use of at least some ferro-chromium in admixture with metallic chromium powder, as well as the use of metallic chromium powder alone. For example, the chromium in the coating may comprise 11.5 to 13.0% of chromium powder and 21.0 to 24.5% of ferro-chromium, the ferro-chromium having a 68% chromium content.

The nickel, chromium and manganese powders are mixed with suitable fluxing, slag-forming, binder, extrusion, reducing and arc stabilizing ingredients to provide a composition suitable for extrusion upon the special mild steel core wire. Such ingredients may comprise 6–17% of alkaline earth carbonates, 2–20% fluorspar, 8.30% titanium dioxide, 4–22% powdered mineral silicates, 1–3% of organic material to aid in extrusion, and 15–30% of sodium silicate binder. The percentages of coating ingredients given are on a weight basis in a wet state.

Any suitable core diameter may be used, and after the application of the coating composition to the core, the diameter of the electrode is aproximately 1.5 to 3 times the diameter of the core.

A core wire having an analysis as above described and having a coating of a composition as above described provides a weld deposit which is well within the requirements of AWS–ASTM Spec.; AWS A5.4–55T—ASTM A–298–55T, Classification No. E–308T, which requires the following analysis of the weld deposit:

|  | Percent |
|---|---|
| Carbon, maximum | .08 |
| Manganese, maximum | 2.50 |
| Phosphorus, maximum | .04 |
| Sulfur, maximum | .03 |
| Silicon, maximum | .90 |
| Chromium | 18.0–21.0 |
| Nickel | 9.0–11.0 |
| Iron | Balance |

The described correlated core wire and coating compositions furnish only 1.40 to 1.90% of manganese in the weld deposit, so that the weld has even better impact strength than obtained with the allowable maximum of 2.50%. The phosphorus in the weld is well within the limit of .04%. When core wire having not more than .005% phosphorus is used, the weld contains as little as .025% phosphorus, thereby providing even better resistance to cracking. The carbon content is well within the limit, even when using ferro-chromium in admixture with chromium powder in the proportions hereinbefore described. Excessive carbon, as well as phosphorus, are prevented by using the pure manganese powder.

Where it is desired to weld chromium-nickel alloy base plates, which also contain molybdenum, Classification No. E–316T of the foregoing AWS–ASTM Spec. requires 2.00 to 2.50% of molybdenum in the weld deposit, with a change in the chromium content to a range of 17 to 20%, and a change of the nickel content to a range of 11 to 14%. The maximum carbon, manganese, phosphorus, sulphur and silicon contents remain the same. To obtain a weld deposit which will meet this specification, the wire core composition may be kept the same, and the metal alloying ingredients of the coating composition as above described are modified to the extent of adding 4.0 to 6.0% of ferro-molybdenum, with a slight change in ranges of the chromium and nickel, or the slagging, fluxing or binder agents. The manganese powder content may be kept the same.

The use of the carbon-free manganese powder allows the molybdenum to be included in the coating in the form of its ferro-compound without increasing the carbon to an extent where the amount of 0.08% in the weld metal is exceeded. Phosphorus is kept well within the limit of 0.04%.

Where it is desired to weld corrosion resistant steel alloy plates of the type containing chromium, but without any nickel therein, the nickel powder may be omitted from the coating composition.

It is believed that the advantages of the invention will be apparent from the foregoing detailed description. The balance provided by the core wire having the described composition and the correlated coating for the wire having the composition described furnish an electrode which will weld stainless steel plates in a manner equally as good as has hitherto been obtained with stainless steel wire electrodes. The cost of manufacture of such electrodes is substantially less than stainless steel wire electrodes, and they are more convenient to use.

It will also be apparent that while the invention has been described in a preferred form, changes may be made to obtain an equivalent relationship of core composition and coating composition without departing from the spirit and scope of the invention as sought to be defined in the following claims.

I claim:

1. A coated electrode adapted for electric arc welding stainless steels, said electrode comprising a core wire of steel having not more than .07% carbon, .40% manganese and .02% phosphorus, said core being coated with a composition containing in approximate ranges 25.5–39.5% chromium and 2.5–9.0% carbon- and phosphorus-free manganese powder, the presence of the latter permitting the inclusion of a ferro-form of alloying ingredient without causing an excess of carbon and phosphorus in the weld, the remainder being fluxing, slag-forming, binder, reducing, and arc stabilizer agents, the weld metal deposited by the coated electrode containing not more than .08 carbon, 2.50 manganese, and .04 phosphorus.

2. A coated electrode adapted for electric arc welding stainless steels as set forth in claim 1, wherein the chromium in the coating comprises a mixture of metallic chromium powder and ferro-chromium.

3. A coated electrode adapted for electric arc welding stainless steels, said electrode comprising a core wire of steel having not more than .07% carbon, .40% manganese and .02% phosphorus, said core being coated with a composition containing in approximate ranges 25.5–39.5% chromium, 11.0–13.5% nickel powder and 2.5–9.0% carbon- and phosphorus-free manganese powder, the presence of the latter permitting the inclusion of a ferro-form of alloying ingredient without causing an excess of carbon and phosphorus in the weld, the remainder being fluxing, slag-forming, binder, reducing, and arc stabilizer agents, the weld metal deposited by the coated electrode containing not more than .08 carbon, 2.50 manganese, and .04 phosphorus.

4. A coated electrode adapted for electric arc welding stainless steels as set forth in claim 3, wherein the chromium in the coating comprises a mixture of metallic chromium powder and ferro-chromium.

5. A coated electrode adapted for electric arc welding stainless steels, said electrode comprising a core wire of steel having not more than .07% carbon, .40% manganese and .02% phosphorus, said core being coated with a composition containing in approximate ranges 11.0–13.5% nickel powder, 2.5–9.0% carbon- and phosphorus-free manganese powder, 25.5–39.5% chromium, 4.0–6.0% ferro-molybdenum, and the remainder fluxing, slag-forming, binder, reducing, and arc stabilizer agents, the weld metal deposited by the coated electrode containing not more than .08 carbon, 2.50 manganese, and .04 phosphorus.

6. A coated electrode adapted for electric arc welding stainless steels, said electrode comprising a core wire of steel having not more than .05% carbon, .40% manganese, .005% phosphorus, .03% sulfur and .03% silicon, said core being coated with a composition containing in approximate ranges 25.5–39.5% chromium, 11.0–13.5% nickel powder and 2.5–9.0% carbon- and phosphorus-free manganese powder, the presence of the latter permitting the inclusion of a ferro-form of alloying ingredient without causing an excess of carbon and phosphorus in the weld, the remainder being fluxing, slag-forming, binder, reducing, and arc stabilizer agents, the diameter of the coated electrode being approximately 1.5 to 3 times the diameter of the core wire, the weld metal deposited by the coated electrode containing not more than .08 carbon, 2.50 manganese, and .04 phosphorus.

7. A coated electrode adapted for electric arc welding stainless steels as set forth in claim 6, wherein the chromium in the coating comprises a mixture of 11.5–13.0% of metallic chromium powder and 21.0–24.5% of ferro-chromium having a 68% chromium content.

8. A coated electrode adapted for electric arc welding stainless steels, said electrode comprising a core wire of steel having not more than .05% carbon, .40% manganese, .005% phosphorus, .03% sulfur and .03% silicon, said core being coated with a composition containing in approximate ranges 11.0–13.5% nickel powder, 2.5–9.0% carbon- and phosphorus-free manganese powder, 25.5–39.5% chromium, 4.0–6.0% ferro-molybdenum, and the remainder fluxing, slag-forming, binder, reducing, and arc stabilizer agents, the diameter of the coated electrode being approximately 1.5 to 3 times the diameter of the core wire, the weld metal deposited by the coated electrode containing not more than .08 carbon, 2.50 manganese, and .04 phosphorus.

9. A coated electrode adapted for electric arc welding stainless steels as set forth in claim 8, wherein the chromium in the coating consists of metallic chromium powder.

References Cited in the file of this patent
UNITED STATES PATENTS

| | | |
|---|---|---|
| 1,893,160 | Clarke | Jan. 3, 1933 |
| 1,967,491 | Austin | July 24, 1934 |
| 2,317,421 | Tholand | Apr. 27, 1943 |
| 2,408,620 | Freidlander | Oct. 1, 1948 |
| 2,861,013 | Sarazin et al. | Nov. 18, 1958 |